(12) United States Patent
Feugier et al.

(10) Patent No.: US 12,087,458 B2
(45) Date of Patent: Sep. 10, 2024

(54) METHOD AND FACILITY FOR CONVERTING URANIUM HEXAFLUORIDE INTO URANIUM DIOXIDE

(71) Applicant: FRAMATOME, Courbevoie (FR)

(72) Inventors: André Feugier, Chatuzange le Goubet (FR); Bruno Mesona, Saint Marcel les Valence (FR)

(73) Assignee: FRAMATOME, Courbevoie (FR)

( * ) Notice: Subject to any disclaimer, the term of this patent is extended or adjusted under 35 U.S.C. 154(b) by 705 days.

(21) Appl. No.: 17/282,916

(22) PCT Filed: Oct. 9, 2018

(86) PCT No.: PCT/FR2018/052497
§ 371 (c)(1),
(2) Date: Apr. 5, 2021

(87) PCT Pub. No.: WO2020/074792
PCT Pub. Date: Apr. 16, 2020

(65) Prior Publication Data
US 2021/0398699 A1 Dec. 23, 2021

(51) Int. Cl.
*G21C 19/48* (2006.01)
*B01J 4/00* (2006.01)
(Continued)

(52) U.S. Cl.
CPC .............. *G21C 19/48* (2013.01); *B01J 4/008* (2013.01); *B01J 12/005* (2013.01); *B01J 12/02* (2013.01);
(Continued)

(58) Field of Classification Search
CPC ......... G21C 19/48; B01J 4/008; B01J 12/005; B01J 12/02; B01J 19/245; B01J 2204/007;
(Continued)

(56) References Cited

U.S. PATENT DOCUMENTS 3,260,575 A * 7/1966 Heestand .............. C01G 43/025
423/261
3,579,311 A * 5/1971 McCoy ................ C01G 43/025
423/261
(Continued)

FOREIGN PATENT DOCUMENTS

CN          1244178 A    2/2000
CN        101293672 A   10/2008
(Continued)

OTHER PUBLICATIONS

Corresponding Search Report for PCT/FR2018/052497.

*Primary Examiner* — Wayne A Langel
(74) *Attorney, Agent, or Firm* — Davidson Kappel LLC

(57) ABSTRACT

A method for converting uranium hexafluoride to uranium dioxide includes steps of hydrolysis of $UF_6$ to uranium oxyfluoride ($UO_2F_2$) in a hydrolysis reactor (4) by reaction between gaseous $UF_6$ and dry water vapour injected into the reactor (4), and pyrohydrolysis of $UO_2F_2$ to $UO_2$ in a pyrohydrolysis furnace (6) by reaction of $UO_2F_2$ with dry water vapour and hydrogen gas ($H_2$) injected into the furnace (6). The hourly mass flowrate of gaseous $UF_6$ supplied to the reactor (4) is between 75 and 130 kg/h, the hourly mass flowrate of dry water vapour supplied to the reactor (4) for hydrolysis is between 15 and 30 kg/h, and the temperature inside the reactor (4) is between 150 and 250° C.

15 Claims, 3 Drawing Sheets

(51) Int. Cl.
  *B01J 12/00* (2006.01)
  *B01J 12/02* (2006.01)
  *B01J 19/24* (2006.01)
  *C01G 43/025* (2006.01)

(52) U.S. Cl.
  CPC .......... B01J 19/245 (2013.01); C01G 43/025 (2013.01); *B01J 2204/007* (2013.01); *C01P 2006/12* (2013.01); *C01P 2006/80* (2013.01)

(58) Field of Classification Search
  CPC .......... B01J 2219/24; B01J 2219/2401; C01G 43/025; C01P 2006/12; C01P 2006/80
  See application file for complete search history.

(56) References Cited

U.S. PATENT DOCUMENTS

| | | | |
|---|---|---|---|
| 3,698,697 A | 10/1972 | Gillies et al. | |
| 3,734,694 A * | 5/1973 | McCoy | C01G 43/025 423/261 |
| 3,845,193 A | 10/1974 | Littlechild et al. | |
| 3,906,081 A * | 9/1975 | Welty | C01G 43/01 423/253 |
| 3,937,784 A * | 2/1976 | Beutner | C01G 56/005 423/19 |
| 4,020,146 A * | 4/1977 | Knudsen | C01G 43/01 423/19 |
| 4,053,559 A * | 10/1977 | Hart | C01G 43/025 423/19 |
| 4,112,055 A * | 9/1978 | Artaud | C01G 43/025 423/253 |
| 4,120,936 A * | 10/1978 | DeLuca | C01G 43/025 534/11 |
| 4,808,390 A | 2/1989 | Tanaka et al. | |
| 6,136,285 A | 10/2000 | Feugier | |
| 7,824,640 B1 | 11/2010 | Lahoda | |
| 2003/0064519 A1 | 4/2003 | Feugier | |
| 2004/0060578 A1 | 4/2004 | Feugier | |
| 2018/0179081 A1 | 6/2018 | Jourdan et al. | |
| 2020/0095133 A1 | 3/2020 | Bae et al. | |
| 2020/0278704 A1 | 9/2020 | Liu et al. | |
| 2021/0347653 A1 * | 11/2021 | Mesona | F27B 7/00 |
| 2021/0387863 A1 * | 12/2021 | Mesona | B01J 19/14 |

FOREIGN PATENT DOCUMENTS

| | | |
|---|---|---|
| CN | 107771163 A | 3/2018 |
| EP | 1024114 A1 | 8/2000 |
| FR | 2788760 A1 | 7/2000 |
| GB | 1320137 A | 6/1973 |
| JP | 2000219516 A | 8/2000 |
| KR | 101856467 B1 | 5/2018 |
| RU | 2211185 C2 | 8/2003 |
| RU | 2002108899 A | 11/2004 |
| WO | WO2015092299 A1 | 6/2015 |

* cited by examiner

METHOD AND FACILITY FOR CONVERTING URANIUM HEXAFLUORIDE INTO URANIUM DIOXIDE

The present disclosure relates to the field of the production of uranium dioxide ($UO_2$) powder, intended in particular for the manufacture of $UO_2$ pellets for nuclear fuel rods.

BACKGROUND

It is possible to enrich uranium in the form of uranium hexafluoride ($UF_6$). However, it is then necessary to convert $UF_6$ into $UO_2$ to make $UO_2$ pellets.

To do this, it is possible to convert gaseous $UF_6$ into uranium oxyfluoride ($UO_2F_2$) by hydrolysis in a reactor, by injecting $UF_6$ gas and dry water vapor into the reactor to obtain $UO_2F_2$ powder, then converting the $UO_2F_2$ powder into $UO_2$ powder by pyrohydrolysis in a furnace, circulating the $UO_2F_2$ powder in the furnace and injecting dry water vapor and hydrogen ($H_2$) gas in the furnace.

To obtain a $UO_2$ powder of homogeneous quality, the furnace may be fitted with means allowing vigorous stirring of the $UO_2F_2$ powder and promoting contact of the $UO_2F_2$ powder with the hydrogen and water vapor.

A co-product resulting from the successive $UF_6 \rightarrow UO_2F_2 \rightarrow UO_2$ conversions is hydrogen fluoride (HF) gas which is very toxic and corrosive.

The hydrolysis reaction is carried out under an atmosphere of neutral gas (or inert gas), preferably under a nitrogen atmosphere. To do this, neutral gas is injected into the reactor, forming a gas flow sweeping the reactor.

In the production phase, to avoid overpressure in the conversion installation, the neutral gas, the excess reactive gases and the hydrogen fluoride resulting from the conversion may be evacuated through filters intended to retain the particles in suspension, especially $UO_2F_2$ and $UO_2$ particles.

The filters become gradually clogged and may be unclogged regularly by countercurrent injection of neutral gas.

To prevent the formation of powder agglomerates on the internal wall of the pyrohydrolysis furnace, the conversion installation may be provided with percussion members which strike against the external wall of the furnace.

U.S. Pat. No. 6,136,285 discloses such an installation for converting $UF_6$ to $UO_2$ for the implementation of such a conversion method.

In such a conversion method, $UO_2$ is generated in the form of a sinterable powder to form $UO_2$ pellets by sintering.

It is difficult to obtain, constantly over time, a quality $UO_2$ powder, i.e. having satisfactory characteristics, in particular in terms of apparent density, specific surface area, particle size, and chemical composition.

To meet the requirements for use in the nuclear industry, a $UO_2$ powder intended to form $UO_2$ pellets must be homogeneous. It must have the lowest possible level of impurities (mainly fluorine) and preferably less than 50 ppm (50 µg/g $UO_2$), a specific surface area of between 1 m$^2$/g and 4 m$^2$/g, a ratio oxygen/uranium between 1.80 and 2.50% and relative humidity less than 1%. It must have good mixing capacity and an aptitude for spontaneous flow (flowability) thus making it possible to withstand high rates of pellet production. Preferably, it also has a homogeneous particle size distribution (normal law) and a reactivity to natural sintering (or sinterability) making it possible to obtain on the sintered ceramic pellet a density greater than 96.5% of the theoretical density of the $UO_2$ and a hardness greater than 15 daN/m.

Obtaining $UO_2$ powder of constant quality requires precise adjustment of the operating parameters of the conversion installation, in particular of injection temperatures and flowrates of the different reactants, and of the conditions, in particular temperature conditions, of hydrolysis and pyrohydrolysis as taught in U.S. Pat. Nos. 6,136,285, 4,112,055, 3,845,193 and 7,824,640.

SUMMARY

It is one of the objectives of the present disclosure to provide a method for converting $UF_6$ to stable $UO_2$ allowing a $UO_2$ powder to be obtained of constant, well-defined quality.

To this end, the present disclosure proposes a method for converting uranium hexafluoride ($UF_6$) to uranium dioxide ($UO_2$), the method comprising the steps of hydrolysis of $UF_6$ to uranium oxyfluoride ($UO_2F_2$) in a hydrolysis reactor by reaction between gaseous $UF_6$ and dry water vapour injected into the reactor, and pyrohydrolysis of $UO_2F_2$ to $UO_2$ in a pyrohydrolyis furnace by reaction of $UO_2F_2$ with dry water vapour and hydrogen gas ($H_2$) injected into the furnace, wherein the hourly mass flowrate of gaseous $UF_6$ supplied to the reactor (4) is between 75 and 130 kg/h, the hourly mass flowrate of dry water vapour supplied to the reactor for hydrolysis is between 15 and 30 kg/h, and the temperature inside the reactor is between 150 and 250° C.

According to particular modes of implementation, the conversion method may comprise one or more of the following optional characteristics, taken in isolation or in any technically feasible combination:

- it comprises the injection of a neutral scavenging gas into the reactor;
- the $UO_2$ is obtained in the form of a powder of $UO_2$ having a specific particle surface area of between 1 m$^2$/g and 4 m$^2$/g, and preferably between 1.9 m$^2$/g and 2.9 m$^2$/g;
- the $UO_2$ has a residual fluorine (F) content of less than 50 ppm, preferably less than 35 ppm;
- the $UF_6$ supplied to the reactor is at a temperature of between 75° C. and 130° C., preferably between 90° C. and 120° C.;
- the dry water vapour for hydrolysis supplied to the reactor is at a temperature of between 175 and 300° C., preferably between 200 et 270° C.;
- the hourly mass flowrate of dry water vapour supplied to the furnace for pyrohydrolysis is between 25 and 40 kg/h, preferably between 30 and 35 kg/h;
- the temperature of the dry water vapour supplied to the furnace for pyrohydrolysis is between 250 and 450° C., preferably between 300 and 400° C.;
- the volume flowrate of $H_2$ supplied to the furnace is between 10 and 25 Nm$^3$/h, in particular between 15 and 20 Nm$^3$/h;
- the flowrate of neutral scavenging gas supplied to the reactor is between 1.5 and 5 Nm$^3$/h, the temperature of the neutral scavenging gas supplied to the reactor is between 80° C. and 130° C., and the relative pressure of the neutral scavenging gas supplied to the reactor is higher than the relative pressure inside the reactor and is preferably lower than 1 bar;
- it comprises the supply of gaseous $UF_6$ to the reactor from an emission device comprising at least one heating chamber, the or each heating chamber receiving a reservoir of $UF_6$ in the solid state and heating the same to generate $UF_6$ in the gaseous state, and a supply circuit configured to supply the reactor from the or each heating chamber;

the emission device comprises at least two heating chambers, the supply circuit being configured to supply the reactor sequentially from the heating chambers, passing from a current heating chamber to a following heating chamber when the reservoir received in said current heating chamber is no longer sufficiently full;

the supply to the reactor from the following heating chamber starts before ceasing of the supply from the current heating chamber, so that the supply to the reactor is carried out simultaneously from both heating chambers for a period of time;

the supply circuit comprises a pump associated with the or each heating chamber to force circulation of $UF_6$ from the reservoir received in the heating chamber towards the reactor, the or each pump preferably being a positive displacement pump and more preferably a positive displacement pump with bellows;

the supply circuit comprises a flowrate regulating valve associated with the or each heating chamber and bypassing the pump associated with the heating chamber.

The present disclosure also concerns an installation to convert uranium hexafluoride ($UF_6$) to uranium dioxide ($UO_2$), the conversion installation comprising a reactor for hydrolysis of $UF_6$ to a powder of uranium oxyfluoride ($UO_2F_2$) by reaction between the gaseous $UF_6$ and dry water vapour injected into the reactor, a furnace for pyrohydrolysis of the $UO_2F_2$ powder to $UO_2$ powder by reaction of the $UO_2F_2$ powder with the dry water vapour and hydrogen gas ($H_2$) injected into the furnace, and a device to supply the reactor and furnace with reactive gases and neutral scavenging gas, the conversion installation being configured to implement a conversion method such as defined above.

In one particular embodiment, the conversion installation comprises an emission device to supply the reactor with $UF_6$, the emission device comprising at least one heating chamber, the or each heating chamber being configured to receive a reservoir of $UF_6$ in the solid state and to heat the same to generate $UF_6$ in the gaseous state, and a supply circuit configured to supply the reactor from the or each heating chamber.

BRIEF SUMMARY OF THE DRAWINGS

The present disclosure and its advantages will be better understood upon reading the following description, given solely by way of example, and made with reference to the accompanying drawings, in which.

DETAILED DESCRIPTION

Figure 1:
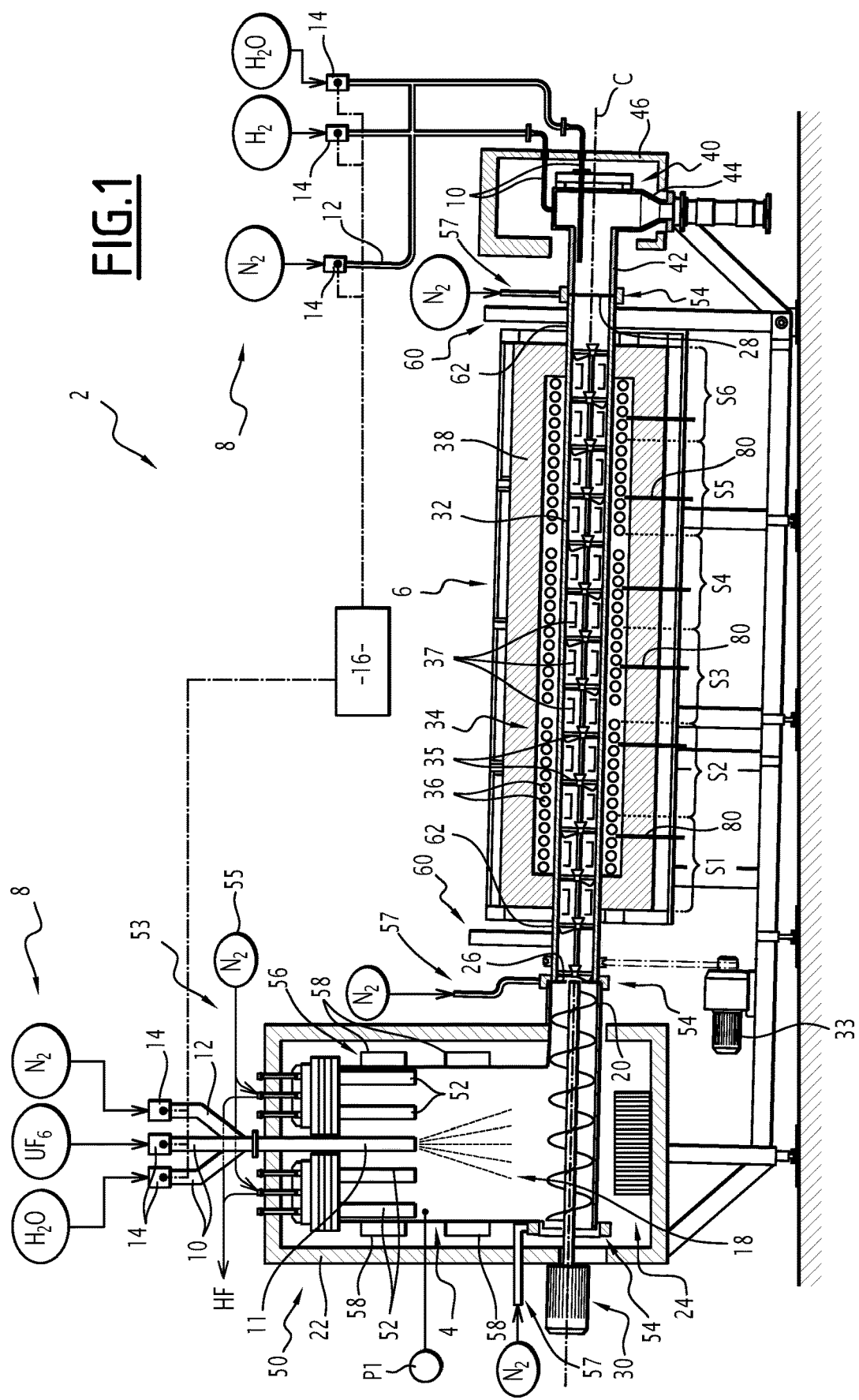
FIG. 1 is a schematic view of a conversion installation for the conversion of $UF_6$ to $UO_2$.

The conversion installation 2 illustrated in FIG. 1 comprises a hydrolysis reactor 4 for the conversion of $UF_6$ into $UO_2F_2$ powder, by reaction between gaseous $UF_6$ and dry water vapor injected into the reactor 4.

The conversion installation 2 comprises a pyrohydrolysis furnace 6 for converting the $UO_2F_2$ powder supplied by the reactor 4 into $UO_2$ powder, by reacting the $UO_2F_2$ powder with dry water vapor and $H_2$ gas injected into the furnace 6.

The conversion installation 2 comprises a supply device 8 designed to inject the reactive gases ($UF_6$ gas, dry water vapor and $H_2$ gas) into the reactor 4 and into the furnace 6.

The supply device 8 is supplied from sources of reactive gases, comprising at least one source of gaseous $UF_6$, at least one source of dry water vapor and at least one source of gaseous $H_2$.

The supply device 8 comprises reagent injection ducts 10 for injecting the reactive gases into the reactor 4 and into the furnace 6. The reagent injection ducts 10 comprise an injection duct for $UF_6$ supplying the reactor 4, a first dry water vapor injection duct supplying the reactor 4, a second dry water vapor injection duct supplying the furnace 6 and an $H_2$ injection duct supplying the furnace 6.

The supply device 8 is further designed for the injection of a neutral gas into the reactor 4, in particular in the production phase of the conversion installation 2, so that the conversion of $UF_6$ into $UO_2F_2$ takes place under a neutral gas atmosphere. In this case, preferably, the supply device 8 is designed to allow the injection of neutral gas into the reactor 4 without injecting the neutral gas into the furnace 6.

The neutral gas injected into reactor 4 in the production phase for carrying out the conversion of $UF_6$ into $UO_2F_2$ is hereinafter referred to as "neutral scavenging gas".

The supply device 8 is preferably designed for the injection of the neutral scavenging gas together with the dry water vapor ($H_2O$) and the $UF_6$.

To do this, as in the example illustrated, the supply device 8 comprises for example a concentric injector 11 making it possible to inject the dry water vapor ($H_2O$), the $UF_6$ and the neutral scavenging gas in a concentric manner, i.e. by forming three concentric injection jets.

Preferably, the supply device 8 is further designed for the injection of neutral gas into the reactor 4 and into the furnace 6, so as to be able to maintain a neutral gas atmosphere in the reactor 4 and in the furnace 6 when the conversion installation 2 is not in production.

Thus, in the production phase, the supply device 8 injects neutral scavenging gas into the reactor 4 in order to convert $UF_6$ into $UO_2F_2$ under a neutral gas atmosphere, without injecting neutral gas into the furnace 6, and, in the shut-down and start-up phase, the supply device 8 injects neutral gas into the reactor 4 and into the furnace 6 so as to maintain a neutral gas atmosphere.

The supply device 8 comprises one or more neutral gas injection ducts 12 for the injection of neutral gas into the reactor 4 and/or into the furnace 6. Each neutral gas injection duct 12 is supplied from a source of neutral gas. The neutral gas is preferably nitrogen ($N_2$).

In the example illustrated, the concentric injector 11 is supplied by the reagent injection pipe 10 supplying the reactor 4 with water vapor ($H_2O$), by the reagent injection duct 10 supplying the reactor 4 with $UF_6$, and by a neutral gas injection duct 12, for the injection of the neutral scavenging gas into the reactor 4. As an option, the supply device 8 may be designed for supplying the reactant injection duct 10 supplying the reactor 4 with water vapor ($H_2O$) and/or the reagent injection duct 10 supplying the reactor 4 with $UF_6$ with neutral gas upon shut-down or start-up of the conversion installation 2.

The supply device 8 comprises a respective supply actuator 14 disposed at the inlet of each reactant 10 or neutral gas 12 injection duct, the supply actuator 14 making it possible to control the flow of gas in the injection duct.

Preferably, the supply actuators 14 are provided in the form of flow regulators, suitable for maintaining the flow of gas passing through them at a set value.

Preferably and in order to avoid any risk of $UF_6$ leakage, the supply actuators 14 of the supply device 8 are resistant to seismic stresses.

The conversion installation 2 comprises an electronic control system 16 for controlling the conversion installation 2 and in particular the supply device 8, in particular the supply actuators 14.

As illustrated in FIG. 1, the reactor 4 delimits a reaction chamber 18 into which the reagent injection ducts 10 open, supplying the reactor 4 with gaseous $UF_6$ and with dry water vapor, and in which the conversion of $UF_6$ to $UO_2F_2$ by hydrolysis takes place. The $UO_2F_2$ thus obtained is in the form of a powder falling to the bottom of the reaction chamber 18.

Reactor 4 has an outlet tubing 20 extending from reaction chamber 18 and connected to furnace 6 so as to transfer $UO_2F_2$ powder from the bottom of reaction chamber 18 to furnace 6.

The conversion installation 2 comprises a thermal chamber 22 surrounding the reactor 4 and a heater 24 for heating the internal volume of the thermal chamber 22 and therefore the reactor 4.

The furnace 6 has an inlet 26 connected to the outlet duct 20 of the reactor 4 to receive the $UO_2F_2$ powder and an outlet 28 to supply the $UO_2$ powder.

The conversion installation 2 comprises a transfer device 30 for transferring the $UO_2F_2$ powder from the reaction chamber 18 to the furnace 6. The transfer device 30 here comprises a motorized endless screw driven by a motor to push the $UO_2F_2$ powder from reaction chamber 18 to inlet 26 of furnace 6.

The furnace 6 comprises a drum 32 having a central axis C, an axial end of which forms the inlet 26 while the opposite axial end forms the outlet 28 of the furnace 6.

The drum 32 is provided for the circulation of the $UO_2F_2$ powder from the inlet 26 to the outlet 28 with circulation of dry water vapor and $H_2$ in the furnace 6 against the current of the $UO_2F_2$ powder.

The drum 32 is rotatably mounted about its central axis C inclined relative to the horizontal so that the inlet 26 is higher than the outlet 28, the rotation of the drum 32 causes the powder to advance from the inlet 26 towards the outlet 28.

The furnace 6 comprises a motorized rotational drive device 33 designed for driving the drum 32 in rotation about its central axis C. The rotational drive device 33 comprises for example a motor and a transmission device, for example a chain or belt, coupling the motor to the drum 32.

As an option, the furnace 6 may be advantageously provided with a crank handle which allows the drum 32 to be turned manually in the event of failure of the rotational drive device 33.

The drum 32 is preferably provided with baffles 35 disposed inside the drum 32 to control the flow of reactive gases and the passage time of the powder in the furnace 6.

Optionally, the drum 32 is provided with lifting members 37 protruding from the inner surface of the drum 32 and designed to lift and let fall the powder present in the drum 32 due to the rotation of the drum 32 about the central axis C, so as to improve the mixing of the powder and promote homogeneous contact of the powder particles with the reactive gases circulating in the drum 32. The lifting members 37 are for example in the form of lifting vanes or lifting angles distributed over the internal surface of the drum 32.

In an advantageous embodiment, the drum 32 of the furnace 6 and the transfer device 30 of the reaction chamber 18 are designed to operate independently of each other, in particular to allow the shutdown of either of them while maintaining the functioning of the other.

In the example illustrated, the drum 32 of the furnace 6 and the transfer device 30 of the reaction chamber 18 are designed for independent rotation of the screw of the transfer device 30, on the one hand, and of the drum 32 on the other hand, and in particular for stopping the rotation of either the screw or the drum 32 while maintaining the rotation of the other.

This arrangement makes it possible, in the phases of shutting down the conversion installation 2, to finish removing the $UO_2$ powder from the furnace 6 while the reactor 4, and in particular the transfer device 30, are already stopped.

In the example illustrated, the second water vapor injection duct and the $H_2$ injection duct supply the drum 32 through the outlet 28 for the circulation of the dry water vapor from the pyrohydrolysis and the $H_2$ from the outlet 28 to inlet 26 of furnace 6.

In the example illustrated, a neutral gas injection duct 12 is connected to the reagent injection duct 10 for the injection of $H_2$ into the furnace 6 and/or to the reagent injection duct 10 for the injection of $H_2O$ into furnace 6, so as to inject neutral gas into furnace 6 via the reagent injection duct(s) 10 when shutting down or starting up the conversion installation 2, the injected neutral gas then circulating from the outlet 28 of the furnace 6 to the inlet 26 of the furnace 6. As an option or as a variant, the supply device 8 comprises a neutral gas injection duct 12 for the injection of neutral gas into the furnace 6 which opens directly into the furnace 6 without passing through a reagent injection duct 10.

The supply of a reactant injection duct 10 with neutral gas when shutting down the conversion installation 2 makes it possible to purge this reagent injection duct 10 when shutting down, while injecting the neutral gas. The supply of a reagent injection duct 10 with neutral gas during a start-up allows the temperature rise of the conversion installation 2 and the supply of the conversion installation 2 with reagents when the reaction parameters are achieved in reactor 4, respectively furnace 6.

The furnace 6 comprises a heater 34 for heating the drum 32. The heater 34 comprises heating elements 36 surrounding the drum 32 and distributed along the drum 32. The furnace 6 comprises a thermal chamber 38 surrounding the drum 32 and the heating elements 36.

The conversion installation 2 comprises a collection device 40 for collecting the powder at the outlet of the furnace 6. The collection device 40 comprises an inlet duct 42 connected to the outlet 28 of the furnace 6 and opening into a collection container 44. The collection device 40 comprises a thermal chamber 46 surrounding the collection container 44. The second vapor injection duct and the $H_2$ injection duct preferably open into the collection container 44.

The conversion installation 2 comprises a capture device 50 for capturing and removing the gases going back to the reactor 4, comprising the excess reactive gases, hydrogen fluoride (HF) resulting from the conversion and the neutral gas.

The capture device 50 is disposed in the reactor 4, preferably in an upper region of the reaction chamber 18.

The capture device 50 comprises a plurality of filters 52 for retaining the solids that may be entrained by the gases going back into the reactor 4, in particular particles of $UO_2F_2$, or even $UO_2$.

Filters 52 are for example made of a porous material allowing the passage of excess reactive gases, neutral gas and HF resulting from the reaction of conversion of $UF_6$ to $UO_2F_2$ then to $UO_2$ while retaining a capacity for retention of $UO_2F_2$ or $UO_2$ particles. In a preferred embodiment, the filters 52 are made of ceramic or a nickel-based superalloy.

$UO_2F_2$ and $UO_2$ powders are volatile and easily carried away by gas streams. In addition, they tend to adhere to the surfaces with which they are in contact.

In operation, powder agglomerates are then created, more or less heterogeneous in terms of composition and more or less compact, on the filters 52 and on the walls of the reactor 4 and of the furnace 6. These powder agglomerates containing fissile material may in particular be concentrated in retention zones which may exist at various points of the conversion installation 2 such as for example at the junction between the reactor 4 and the furnace 6.

Powder agglomerates may break off under their own weight and mix with $UO_2F_2$ powder and $UO_2$ powder in the powdery state. The presence of compact clusters in the powder creates heterogeneity in the treatment of the powder in furnace 6 and may lead to the presence of residual $UO_2F_2$ particles in the $UO_2$ powder obtained at the end of the conversion, thus degrading its quality.

In addition, the accumulation of powder on the filters 52 causes a progressive clogging of the filters 52 and causes an increase in the internal pressure of the reactor 4. The pressure variations have a significant impact on maintaining a constant quality of the $UO_2$ powder obtained at the end of the conversion and an excessively high internal pressure of the reactor 4 may lead to a safety alert of the conversion installation 2.

When the filters 52 are clogged with the $UO_2F_2$ and/or $UO_2$ powders, it is necessary to stop the conversion installation 2 and to clean or change the filters 52, which is tedious and expensive.

Clogging may also occur at the level of the device for injecting the reactants into the reactor 4, here the concentric injector 11. In fact, if the injection pressure and temperature the gas are not sufficient, the $UF_6$ may crystallize at the outlet of the concentric injector 11 and thus block the supply of reactants to the reactor 4. It is therefore important to maintain a constant supply pressure, in particular when the source of $UF_6$ changes.

The conversion installation 2 advantageously comprises an unclogging device 53 designed for unclogging the filters 52, for example by pulse injection of neutral gas through the filters 52 against the current, i.e. towards the interior of the reaction chamber 18 of reactor 4. The neutral gas is, for example, nitrogen ($N_2$).

The injection of neutral gas against the current is liable to disturb the pressure balance inside the reactor 4. It is desirable to carry out the unclogging in a controlled manner, according to determined parameters so as to limit disturbances in the operation of the reactor 4, and in particular the pressure inside the reactor 4.

Advantageously, the unclogging device 53 is designed to perform the unclogging of the filters 52 in an automated manner, by carrying out the unclogging sequentially through separate groups of filters 52.

The unclogging device 53 is then designed to inject the neutral gas against the current sequentially into the different groups of filters 52. Each group of filters 52 comprises a single filter 52 or several filters 52.

In a preferred embodiment, the filters 52 are grouped into two groups each containing a respective half of the filters 52 and the unclogging is carried out alternately in the two groups with an injection of neutral gas carried out periodically, for example every 30 seconds. It is also possible to carry out the unclogging cycle, for example by thirds or by fourths, and/or to adapt the injection frequency.

The neutral gas injection pressure against the current in each filter 52 is chosen to limit the disturbances in the reactor 4. A relative pressure applied to each filter 52, preferably between 2 and 5 bars, in particular between 3 and 4.5 bars, makes it possible to obtain satisfactory unclogging of the filter 52. Unless otherwise stated in the text, the expression "relative pressure" refers to the pressure difference with respect to atmospheric pressure.

In order to guarantee a constant injection pressure of the neutral gas, the unclogging device 53 is for example supplied from a reservoir 55 containing the neutral gas and maintained at a constant pressure.

The duration of injection of neutral gas against the current in each filter 52 is chosen to limit the disturbances in the reactor 4 while allowing satisfactory cleaning, in particular over the entire surface of the filter 52 during the injection period. The duration of injection of neutral gas against the current in each filter 52 is for example less than 1 s.

Preferably, during the injection of neutral gas against the current into each filter 52, the capture device 50 is designed to cut off the suction through this filter 52 before the injection of neutral gas against the current to prevent the neutral gas used for unclogging escaping directly via the capture device 50.

Preferably, the unclogging device 53 is designed to perform the unclogging cyclically, in particular with a period chosen to avoid the accumulation of powders on the filters 52 while limiting the impact of this injection on the operation of the conversion installation 2. Preferably, the period is between 30 seconds and 1 minute.

Thus, according to a preferred embodiment, the unclogging device is designed to repeat the unclogging sequence automatically and cyclically (or periodically). Automatic, sequential and periodic unclogging of the filters 52 makes it possible to ensure operation of the conversion installation 2, for example at a relative pressure of between 10 mbar and 500 mbar in the reactor 4, preferably between 50 and 400 mbar and more preferably between 100 and 350 mbar, which makes it possible to obtain a $UO_2$ powder having satisfactory characteristics, in particular a reasonable fluorine content which is substantially constant over time.

The unclogging of the filters 52 causes the falling of the powder clusters formed on the filters 52 and prevents an excessive rise in pressure in the reaction chamber 18.

The sequential and periodic unclogging makes it possible to limit the size and the compactness of the agglomerates of solids formed on the filters 52 and to avoid their detachment under their own weight and their fall by gravity in too great a quantity at the bottom of the reaction chamber 18 in the transfer device 30. The mixture of compact agglomerates with the powder of $UO_2F_2$ in the pulverulent state may in fact induce heterogeneities in the physical and chemical characteristics of the $UO_2$ powder which is obtained therefrom and in particular on its fluorine content.

The unclogging carried out in groups of several filters 52 prevents the powder expelled from a filter 52 from sticking to another filter 52 as could be the case with an individual unclogging of the filters 52. The unclogging carried out by groups of several filters 52 makes it possible to generate a powder mist and to limit the formation of clumps.

As an optional addition to the sequential and periodic unclogging, the unclogging device 53 may include a control, manual or automatic, to allow one-off unclogging of the filters 52, in particular when they reach the end of their life and the sequential and periodic unclogging becomes insufficient. This punctual unclogging may be unclogging by one of the filters 52 or by unclogging of a group of filters 52 of reduced size.

As illustrated in FIG. 1, preferably, the conversion installation 2 further comprises at least one flow device 56 designed to prevent the accumulation of powder on the walls of the reaction chamber 18 and sticking on the walls of the reaction chamber 18 of the powder clusters evacuated from the filters 52 during the unclogging operation.

The flow device 56 makes it possible to promote a continuous flow of the powder and stable conditions for supplying the furnace 6 with $UO_2F_2$ powder both in terms of quantity and in terms of quality, and in particular with a stable fluorine content over time.

The flow device is designed to vibrate and/or impact at least one wall of the reactor 4, preferably regularly or continuously.

The flow device 56 comprises for example one or more percussion members, each percussion member being designed to impact a wall of the reactor 4 so as to generate a shock wave in the walls of the reactor 4, and/or one or more vibrating members, for example vibrating pots, each vibrating member being arranged on a wall of the reactor 4 and designed to generate a vibratory signal (or vibration) and transmit this vibration to the walls of the reactor 4. In a preferred embodiment, the flow device 56 comprises one or more members which generate shocks to lift the powder from the wall as well as vibrations to help it flow.

In the following, the percussion organs, the vibrating organs and the organs delivering the two functions are called "flow members".

Thus, in general, the flow device comprises at least one flow member designed to vibrate and/or strike a wall of the reactor 4.

The flow members allow regular or even continuous vibration of the walls of the reactor 4.

The flow device 56 here comprises four flow members 58, for example of the electro-striker type, arranged two by two in two diametrically opposed positions of the outer surface of the wall of the reactor 4.

Advantageously, when the flow device 56 comprises several flow members 58 and when the reactor 4 is in operation, the flow members 58 are controlled to act sequentially.

The number, position and operating sequence of the flow members 58 may be designed as a function of the geometry of the reactor 4, the quality of the powder and the operating parameters of the unclogging device 53.

Each flow member 58 may be fixed directly to the wall of the reactor 4 or, for example, via an intermediate part. In this case, the intermediate part may be for example removable to facilitate its maintenance.

The combination of the unclogging device 53 and a flow device 56 makes it possible to limit the size and the compactness of the powder clusters which are deposited on the filters 52 and on the walls of the reactor 4, to control the falling of the clusters to the bottom of reactor 4 and thus ensure the homogeneity of the $UO_2$ powder, in particular a fluorine content which is substantially constant over time.

The conversion installation 2 comprises sealing devices 54 to ensure sealing between the transfer device 30 and the reaction chamber 18, between the reactor 4 and the furnace 6 and between the furnace 6 and the collection device 40. The sealing devices 54 are arranged at the junction between the transfer device 30 and the reaction chamber 18, at the junction between the outlet duct 20 of the reactor 4 and the inlet 26 of the furnace 6, and at the junction between the outlet 28 of the furnace 6 and the inlet duct 42 of the collection device 40. The sealing devices 54 ensure the sealing by allowing the rotation of the transfer device 30 relative to the reactor 4 and the rotation of the drum 32 of the furnace 6 relative to the reactor 4 and to the collection device 40.

The sealing devices 54 are pressurized with an inert gas, and preferably with nitrogen.

To this end, as illustrated in FIG. 1, the conversion installation 2 comprises, for example, pressurization supplies 57 arranged to supply the sealing devices 54 with an inert pressurization gas.

The pressure of the neutral gas supplying the sealing devices 54 is greater than that present in the conversion installation 2 to prevent any dispersion of powder outside the conversion installation 2. In practice, the neutral gas for pressurizing the sealing devices 54 may pass into the reactor 4 and/or into the furnace 6, and the operating parameters of the reactor 4 and of the furnace 6 are designed to take into account this supply of neutral gas.

The conversion installation 2 comprises at least one percussion device 60 for striking a percussion surface 62 of the furnace 6 so as to detach the $UO_2F_2$ or $UO_2$ powder from the internal surface of the drum 32.

The conversion installation 2 here comprises a percussion device 60 disposed at each axial end of the drum 32 to strike a percussion surface 62 formed by the outer surface of the axial end of the drum 32 axially exiting the thermal chamber 38 of the furnace 6. As a variant, the percussion surface 62 may be defined by any other surface of the furnace 6 making it possible to transmit vibrations to the peripheral wall of the drum 32 when this percussion surface 62 of the furnace 6 is struck.

The conversion installation 2 may advantageously comprise several percussion devices 60 disposed at the same end of the drum 32, being distributed angularly around the drum 32.

In a preferred embodiment, the conversion installation 2 comprises two groups of percussion devices 60, each group being disposed at a respective end of the two ends of the drum 32, and the percussion devices 60 of each group being distributed angularly around the drum 32.

The percussion devices 60 are similar. Only one percussion device 60 is illustrated in more detail in FIG. 2.

Figure 2:
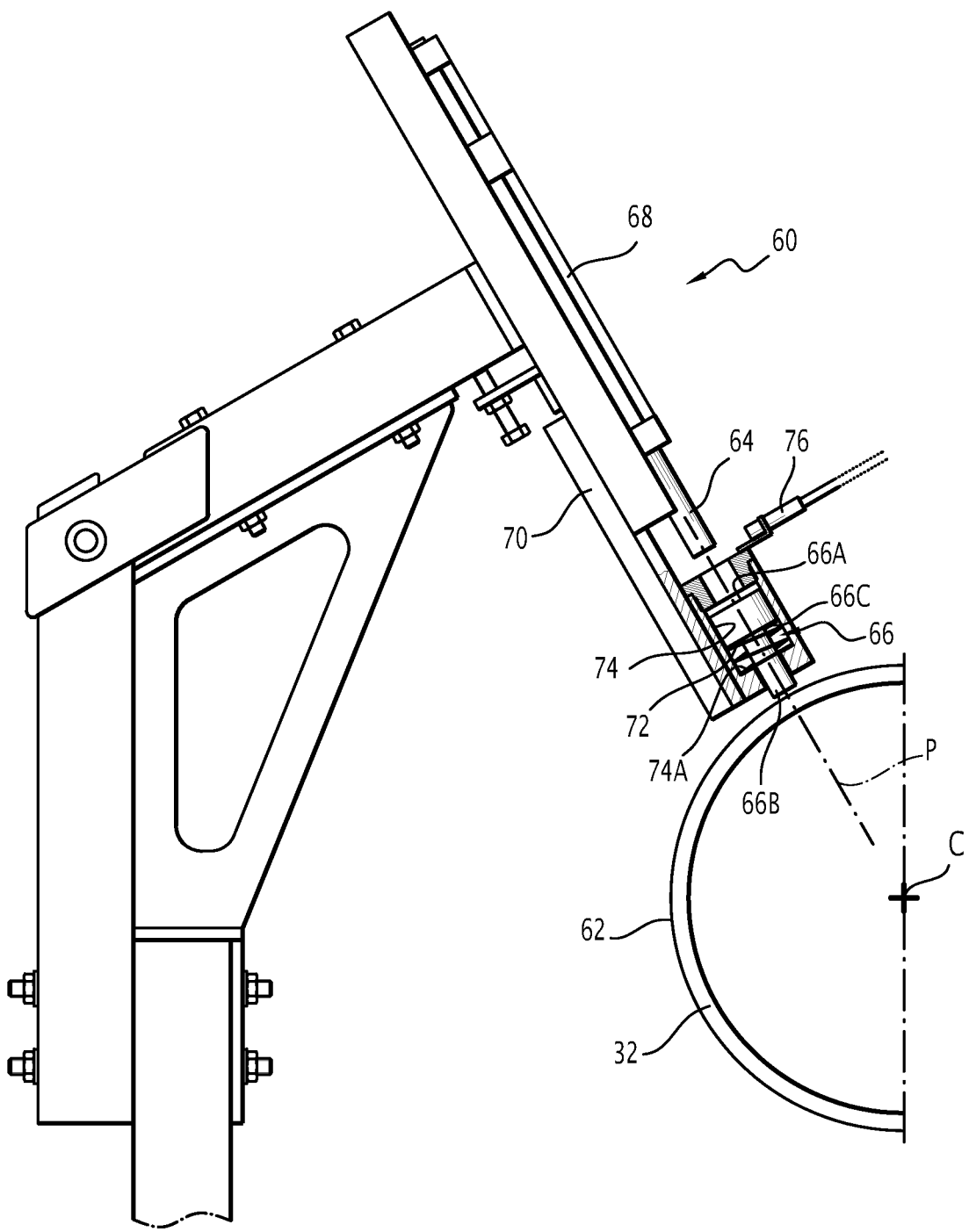
FIG. 2 is a schematic view of a percussion device for impacting the pyrohydrolysis furnace.

As illustrated in FIG. 2, each percussion device 60 comprises a striker 64 movable relative to the percussion surface 62 in a percussion direction P and an intermediate part 66 disposed between the striker 64 and the percussion surface 62 so that the striker 64 strikes the percussion surface 62 via the intermediate part 66, the intermediate part 66 being movable in the direction of percussion P between a position spaced apart from the percussion surface 62 and a position of contact with the percussion surface 62 of the furnace 6.

The percussion direction P is here perpendicular to the plane tangent to the percussion surface 62 at the point of contact of the intermediate part 66 with the percussion surface 62. The percussion direction P is here substantially radial with respect to the central axis C of the drum 32.

The striker 64 is carried by a percussion actuator 68 suitable for moving the striker 64 in reciprocating translation in the direction of percussion P. The percussion actuator 68 is here a double-acting hydraulic or pneumatic cylinder.

The percussion device 60 has a support 70 carrying the actuator 68 and the intermediate part 66, so that the intermediate part 66 is located between the striker 64 and the percussion surface 62. The intermediate part 66 is slidably mounted on the support 70 following the percussion direction P.

The intermediate part 66 has a rear surface 66A designed to be struck by the striker 64, and a front surface 66B designed to come into contact with the impact surface 62. In the contact position, the front surface 66B is in contact with the percussion surface 62, while in the spaced apart position, the front surface 66B is spaced apart from the percussion surface 62.

The percussion device 60 comprises an elastic return member 72 arranged to return the intermediate part 66 to the spaced apart position. The intermediate part 66 is received in a housing 74 of the support 70, the elastic member 72 being interposed between an internal shoulder 74A of the housing 74 and an external shoulder 66C of the intermediate part 66.

The elastic member 72 is here a helical spring surrounding the intermediate part 66 and compressed when the intermediate part 66 moves from the spaced apart position to the contact position.

The percussion device 60 comprises a position sensor 76 making it possible to know the position of the striker 64. The position sensor 76 is for example an inductive sensor disposed near the intermediate part 66, and making it possible to determine whether the striker 64 is in the contact position or not with the intermediate part 66. The percussion actuator 68 is controlled as a function of the position signal supplied by the position sensor 76.

In operation, the percussion actuator 68 moves the striker 64 in reciprocating translation so as to move the striker 64 away from the intermediate part 66 and then move the striker 64 against the intermediate part 66, so as to strike the percussion surface 62 by the intermediate part 66. The striker 64 moves intermediate part 66 from the spaced apart position to the contact position against the elastic member 72.

The repeated impacts of the striker 64 could damage the striker 64 itself and the outer surface of the drum 32. The provision of an intermediate part 66 separate from the striker 64 and which is not permanently linked to the furnace 6, allows the intermediate part 66 to be used as a disposable part or a wearing part. In the example illustrated, the intermediate part 66 is mounted to move relative to the furnace 6.

Obtaining a $UO_2$ powder exhibiting satisfactory characteristics, in particular an impurity content, essentially fluorine, of less than 50 ppm, a homogeneous particle size distribution situated for example in the range from 20 to 100 μm, and a specific surface area less than 4 $m^2/g$, depends on the operating conditions of hydrolysis and pyrohydrolysis, in particular of the supply rates of the reactants and of the temperature.

The supply device 8 is designed to supply the reactants and the neutral gas, in particular the neutral scavenging gas, at determined flow rates.

The heater 24 of the reactor 4 is designed to maintain the reactor chamber 4 in an adequate temperature range to obtain $UO_2F_2$ and then $UO_2$ powders with the desired characteristics.

Advantageously, during a stabilized production phase, the hourly mass flow rate of the supply to reactor 4 with gaseous $UF_6$ is between 75 and 130 kg/h, the hourly mass flow rate of supply to the reactor 4 with dry water vapor lies between 15 and 30 kg/h, and the temperature in the reactor 4 lies between 150 and 250° C.

These ranges of values make it possible to obtain $UO_2F_2$ powder, ultimately making it possible to obtain $UO_2$ powder with the desired characteristics. In particular, these ranges of values make it possible to obtain $UO_2$ powder having a specific particle surface area of between 1 $m^2/g$ and 4 $m^2/g$, and preferably between 1.9 $m^2/g$ and 2.9 $m^2/g$. In addition, these ranges of values make it possible to obtain $UO_2$ powder with a residual fluorine (F) content of less than 50 ppm, preferably less than 35 ppm and more preferably less than 20 ppm.

In an advantageous embodiment, the hourly mass flow rate of supply to reactor 4 with gaseous $UF_6$ is between 90 and 120 kg/h and the hourly mass flow rate of supply to reactor 4 with dry hydrolysis water vapor is between 20 and 25 kg/h.

To prevent crystallization of $UF_6$ during its injection into reactor 4, reactor 4 is supplied with $UF_6$ at a supply temperature of between 75° C. and 130° C., preferably between 90° C. and 120° C.

In a particular embodiment, the conversion installation 2 comprises an emission device making it possible to emit the $UF_6$ continuously to the reactor 4 with a regulated flow rate and a temperature of $UF_6$.

The $UF_6$ is transported in tanks which are for example cylindrical. At room temperature, $UF_6$ is in the solid state. The change from the solid state to the gaseous state is carried out by heating the tanks, for example in a heating chamber, in particular in a furnace (not waterproof) or in an autoclave (waterproof).

Figure 3:
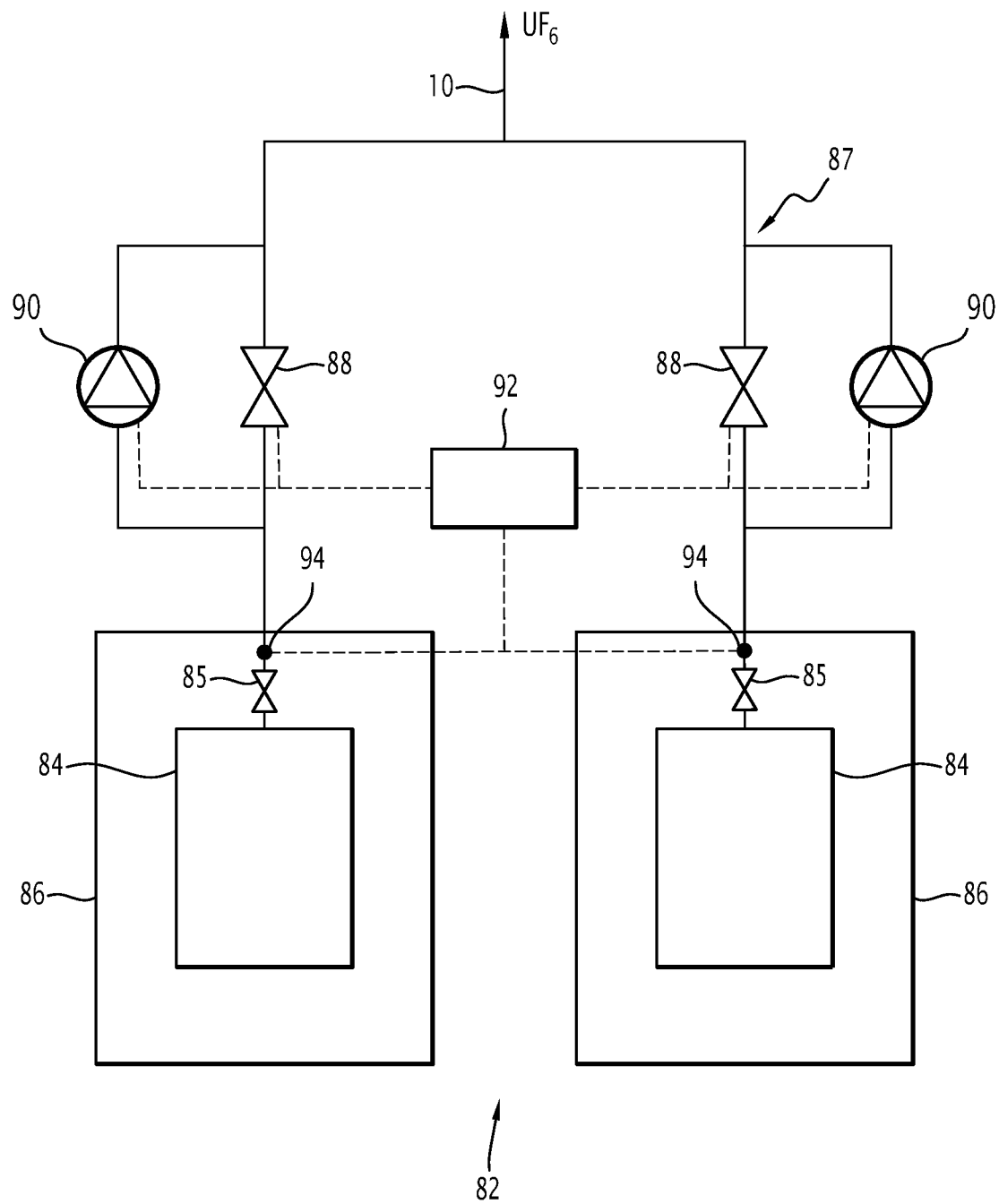
FIG. 3 is a schematic view of a device for emitting $UF_6$ gas for the continuous supply of the hydrolysis reactor.

As illustrated in FIG. 3, the conversion installation 2 has an emission device 82 for supplying the reactor 4 with $UF_6$ gas from tanks 84 containing $UF_6$. Each reservoir 84 is closed by a sealing valve 85.

The emission device 82 comprises at least two heating chambers 86, each heating chamber 86 being designed to receive a reservoir 84 of $UF_6$ in the solid state and to heat it to generate $UF_6$ in the gaseous state, the emission device 82 being designed to supply the reactor 4 sequentially from the heating chambers 86, passing from a current heating chamber 86 to a following heating chamber 86 when the reservoir 84 is received in said current heating chamber 86 is no longer sufficiently full, preferably without interrupting the flow of $UF_6$ gas supplying the reactor 4. Preferably, each heating chamber 86 is able to heat and maintain the respective reservoir 84 at a temperature above the triple point temperature of $UF_6$, for example at a temperature above 75° C. and preferably at a nominal temperature of 95° C., for example 95° C.±10° C.

The emission device 82 thus comprises a supply circuit 87 designed for the emission of $UF_6$ to the reactor 4 selectively from one of the heating chambers 86, while the other heating chamber 86 heats a reservoir 84 in waiting for the emission of $UF_6$ from this reservoir 84 or is recharged with a reservoir 84 filled with $UF_6$.

Each heating chamber 86 is for example connected to the reactor 4 by means of a valve 88 for regulating the respective flow rate, the closure of which makes it possible to isolate the heating chamber 86 from the reactor 4 while its opening makes it possible to fluidly connect the heating chamber 86 to the reactor 4. The opening of the valve 85 of the reservoir 84 then of the valve 88 allows the flow of $UF_6$ from the heating chamber 86 to the reactor 4 due to a pressure difference between the reservoir 84 and reactor 4. Heating chamber 86 is then in a passive emission mode.

As an option, each reservoir 84 is connected to the reactor 4 by means of a respective pump 90 associated with each heating chamber 86 and disposed in parallel with the valve 88 associated with this heating chamber 86. The pump 90 is preferably a positive displacement pump and more preferably a positive displacement pump with bellows.

Activation of the pump 90 makes it possible to force the circulation of the gaseous $UF_6$ from the heating chamber 86 to the reactor 4 when the pressure in the reservoir 84 contained in the heating chamber 86 is insufficient to ensure this circulation. The heating chamber 86 is then in an active emission mode. When valve 88 is open, pump 90 is bypassed.

The emission device 82 comprises for example a device for opening the valve of the respective reservoir 84 from the outside of each heating chamber 86 and an electronic control unit 92 designed to control the valve 88 and, if necessary, the pump 90 associated with each heating chamber 86 and ensure the power supply sequentially from the heating chambers 86, and, where appropriate, the passage from passive mode to active mode for each heating chamber 86.

The emission device 82 is for example designed to control the passage from one heating chamber 86 to the next, and where appropriate the passage from passive mode to active mode in a manner dependent on the pressure in each reservoir 84.

To do this, the emission device 82 comprises for example a pressure sensor 94 associated with each reservoir 84, the electronic control unit 92 being designed to control the valve 88 and, if necessary, the pump 90 associated with each heating chamber 86 according to the measurements provided by the pressure sensors 94.

At the start of a production cycle, a reservoir 84 is heated in a first heating chamber 86, preferably under a neutral gas atmosphere to improve the heat exchanges between the atmosphere of the heating chamber 86 and the reservoir 84. The neutral gas is, for example, nitrogen. When the required temperature is reached, i.e. when the solid $UF_6$ has been liquefied and the $UF_6$ in the reservoir 84 is in a phase of liquid/gas equilibrium, and after opening the sealing valve 85 of the reservoir 84, the valve 88 disposed between the outlet of this first heating chamber 86 and the injection duct 10 of the $UF_6$ in the reactor 4 opens and the emission of $UF_6$ begins in passive emission mode from this first heating chamber 86. In parallel, the heating of another reservoir 84 in a second heating chamber 86 begins.

As the emission of $UF_6$ progresses, the pressure in the reservoir 84 of the first heating chamber 86 drops to a value close to that which may cause a drop in the flow rate of $UF_6$ and the reversal of the flows between the reactor 4 and the reservoir 84 received in this first heating chamber 86. There are then still several kilograms of $UF_6$ in the reservoir 84. Before reaching this stage, the first heating chamber 86 switches from passive emission mode to active emission mode with the closing of the valve 88 and the starting of the corresponding pump 90. The emission of $UF_6$ may thus continue until emission of almost all of the $UF_6$ contained in the reservoir 84 of the first heating chamber 86, for example with a pressure at the end of emission of 100 mbar absolute in the reservoir 84. At this moment, the reservoir 84 received in the second heating chamber 86 has reached the temperature required for the emission of $UF_6$ and the sealing valve 85 of the reservoir 84 is open. The valve 88 associated with the first heating chamber 86 closes and the valve 88 associated with the second heating chamber 86 opens and the emission of $UF_6$ continues from the reservoir 84 of the second heating chamber 86 without interruption and without significant modification of the flow rate, of the temperature and of the pressure of the $UF_6$ during the switching from the first heating chamber 86 to the second heating chamber 86.

In parallel, the valve 85 of the reservoir 84 received in the first heating chamber 86 is closed and, after cooling, the first heating chamber 86 is vented to atmosphere, unlocked and the reservoir 84 is evacuated and replaced by a new reservoir 84 filled with $UF_6$.

As a variant and to further reduce the variations in supplying the reactor 4 with $UF_6$, the valve 88 associated with the second heating chamber 86 may open before the valve 88 associated with the first heating chamber 86 closes and the $UF_6$ emission continues from the two reservoirs 84, the first heating chamber 86 operating in active emission mode and the second heating chamber 86 operating in passive emission mode. The opening of the valve 88 associated with the second heating chamber 86 may take place, for example, when the valve 88 is closed and when the pump 90 of the first heating chamber 86 is started up or at any other time before stopping the emission of $UF_6$ by the reservoir 84 of the first heating chamber 86.

Preferably and in order to be able to cut off the $UF_6$ supply as close as possible to the emission source under all circumstances, the valves 88 are resistant to seismic stresses.

The emission device 82 allows continuous production of the conversion installation 2, using almost all of the $UF_6$ contained in the reservoirs 84 with an emission of $UF_6$ at the required pressure and temperature and with the required flow.

Preferably, the reactor 4 is supplied with dry hydrolysis water vapor at a supply temperature of between 175° C. and 300° C., in particular between 200° C. and 270° C.

Preferably, the furnace 6 is supplied with dry water vapor from pyrohydrolysis water with an hourly mass supply rate of between 25 and 40 kg/h, in particular between 30 and 35 kg/h.

Also preferably, the furnace 6 is supplied with dry water vapor from pyrohydrolysis water at a supply temperature of between 250° C. and 450° C., preferably between 300° C. and 400° C.

Preferably, the volume flow rate for supplying the furnace 6 with $H_2$ is between 10 and 25 $Nm^3/h$, in particular between 15 and 20 $Nm^3/h$ ("$Nm^3/h$" means normal cubic meters per hour and is a unit of measurement of the quantity of gas which corresponds to the content of a volume of one cubic meter, for a gas found in normal conditions of temperature and pressure (20° C. and 1 atm)). The this usually injected at room temperature.

The injection parameters of the neutral scavenging gas supplied to reactor 4 influence the reactions occurring in reactor 4.

Preferably, the supply rate of the neutral scavenging gas of the reactor 4 is between 1.5 and 5 $Nm^3/h$, the injection temperature of the neutral scavenging gas is between 80° C. and 130° C., and the relative supply pressure of this neutral scavenging gas is greater than the relative pressure inside the reactor 4 and is preferably less than 1 bar.

In a particular embodiment, the supply rate of the neutral scavenging gas is between 2 and 3 $Nm^3/h$ and the injection temperature of the neutral scavenging gas is between 90 and 105° C.

Furthermore, the heating elements 36 of the furnace 6 are controlled to establish in the furnace 6 a gradually increasing and then decreasing temperature from the inlet 26 of the furnace 6 to the outlet 28 of the furnace 6.

Furnace 6 comprises for example several successive sections defined along furnace 6, in this case six successive sections S1 to S6 from inlet 26 to outlet 28 of furnace 6, each section S1 to S6 being heated by heating elements 36 dedicated to this section S1 to S6.

The furnace 6 comprises a respective temperature sensor 80 associated with each section S1 to S6. The temperature of each section of the furnace 6 is considered to be that measured by the temperature sensor 80 associated with this section. Each temperature sensor 80 is for example a thermocouple adjacent to the heating elements 36 associated with the section.

The heating elements 36 dedicated to each section S1 to S6 are controlled independently of those dedicated to the other sections so that the temperature measured by the temperature sensor 80 located in this section is located at a determined set value.

In an advantageous embodiment, each section S1 to S6 is provided with several temperature sensors 80 and the temperature of each section S1 to S6 of the furnace 6 is considered to be the average of the temperatures measured by the temperature sensors 80 in associated with this section S1 to S6.

In an advantageous embodiment, the heating elements 36 of the furnace 6 are controlled to establish a following temperature profile:
first section S1: between 660 and 700° C.
second section S2: between 700 and 730° C.
third section S3: between 720 and 745° C.
fourth section S4: between 730 and 745° C.
fifth section S5: between 660 and 700° C.
sixth section S6: between 635 and 660° C.

This temperature profile makes it possible to control the evolution of the pyrohydrolysis of the $UO_2F_2$ powder, which is a complex reaction made up of several elementary reactions which depend in particular on the temperature.

In the production phase, the unclogging device 53 performs periodic unclogging, automatically and regularly. In addition, preferably, the flow device 56 vibrates and/or strikes the reactor 4, automatically, regularly or continuously, and/or the percussion device 60 strikes the furnace 6, automatically and regularly, to drop the powder stuck to the internal walls before it forms large and/or compact clumps.

The filters 52 may nevertheless become excessively clogged during the operation of the conversion installation 2 and as they age.

The increase in the relative pressure inside the reactor 4 is generally representative of the fact that the unclogging of the filters 52 becomes insufficient.

Monitoring the pressure inside reactor 4 makes it possible to monitor the efficiency of cleaning.

Preferably, in the stabilized production phase, it is desirable that the relative pressure inside the reactor 4 remains between 10 mbar and 500 mbar, preferably between 50 and 400 mbar and more preferably between 100 and 350 mbar.

Conversion installation 2 comprises a pressure sensor P1 to measure the pressure inside reactor 4.

Preferably, if the relative pressure inside the reactor 4 exceeds a predetermined safety threshold, the control system 16 is designed to order a shutdown of the conversion installation 2.

The safety threshold is for example between 100 and 500 mbar, preferably between 200 and 450 mbar and even more preferably between 200 and 400 mbar, in particular around 350 mbar.

Advantageously, if the relative pressure inside the reactor 4 exceeds a predetermined unclogging threshold, the unclogging device 53 is controlled to carry out unclogging of the filters 52. This punctual unclogging may be carried out with an unclogging injection pressure in the upper part of the injection pressure range of neutral gas for sequential unclogging or even at an injection pressure greater than said range.

The punctual unclogging may moreover be carried out specifically on one or more filters 52, for example individually on one or more particular filters 52 which would be blocked individually or together on a limited number of filters 52.

The punctual unclogging threshold is for example set in a range of 100 mbar below the safety pressure of the installation and is for example 50 mbar and preferably 30 mbar lower than the safety threshold of the installation.

As a matter of fact, in the event of significant clogging of the filters 52, the pressure increases rapidly in the reactor 4 and it becomes difficult, if not impossible, to unclog the filters 52 without stopping the installation in order to carry out manual cleaning or their replacement or without creating heterogeneities of the $UO_2$ powder at the outlet due to the addition to the $UO_2F_2$ powder of uncontrolled quantities of agglomerates falling from the filters 52 into the transfer device 30 during the unclogging operation.

During unclogging, the injection of neutral gas inside each filter 52 makes it possible to expel the $UO_2F_2$ powder particles trapped on the outer surface of the filter 52, while limiting the disturbances of the reactor 4 operating at a pressure relative between 10 mbar and 500 mbar.

The setting in vibration and/or the percussion of one or more walls of the reactor 4, here by the flow device 56 equipping the reactor 4, also makes it possible to detach the particles of $UO_2F_2$ powder which may be deposited on the inner wall of the reactor 4.

The striking of a percussion surface 62 of the furnace 6, here by the percussion device 60, makes it possible to prevent the formation of powder clusters in the furnace 6, which could also affect the quality of the $UO_2$ powder produced. by the conversion installation 2.

Controlling the flow rates of reactive gases and neutral scavenging gas and the temperature in the reactor 4 and in the furnace 6 also allow the establishment of hydrolysis and pyrohydrolysis reactions under conditions for obtaining satisfactory $UO_2$ powder.

In general, in operation, all of the gases injected into reactor 4 or into furnace 6 are injected at a pressure greater than that existing in reactor 4 or furnace 6, for example at a pressure of at least 20 mbar at above the pressure inside the reactor 4 or the furnace 6, and preferably at least 50 mbar above.

What is claimed is:

1. A method for converting uranium hexafluoride (UF6) to uranium dioxide (UO2), the method comprising the steps of:
hydrolysis of UF6 to uranium oxyfluoride (UO2F2) in a hydrolysis reactor by reaction between gaseous UF6 and dry water vapor injected into the hydrolysis reactor; and
pyrohydrolysis of UO2F2 to UO2 in a pyrohydrolysis furnace by reaction of UO2F2 with dry water vapor and hydrogen gas (H2) injected into the pyrohydrolysis furnace,
an hourly mass flowrate of gaseous UF6 supplied to the reactor being between 75 and 130 kg/h, an hourly mass flowrate of dry water vapor supplied to the reactor for hydrolysis being between 15 and 30 kg/h, and a temperature inside the hydrolysis reactor being between 150 and 250° C.

2. The conversion method according to claim 1, further comprising supplying gaseous UF6 to the reactor from an emission device comprising at least one heating chamber, the or each heating chamber receiving a reservoir of UF6 in the solid state and heating the reservoir of UF6 to generate UF6 in the gaseous state, the emission device comprising a supply circuit configured to supply the hydrolysis reactor from the or each heating chamber.

3. The conversion method according to claim 2, wherein the emission device comprises at least two heating chambers, the supply circuit being configured to supply the reactor sequentially from the heating chambers, passing from a current heating chamber to a following heating chamber when the reservoir received in said current heating chamber is no longer sufficiently full.

4. The conversion method according to claim 3, wherein the supply to the hydrolysis reactor from the following heating chamber starts before ceasing of the supply to the hydrolysis from the current heating chamber, so that the supply to the hydrolysis reactor continues simultaneously from both heating chambers for a period of time.

5. The conversion method according to claim 2, wherein the supply circuit comprises a pump associated with the or each heating chamber to force circulation of UF6 from the reservoir received in the heating chamber towards the hydrolysis reactor.

6. The conversion method according to claim 5, wherein the supply circuit comprises a flowrate regulating valve associated with the or each heating chamber and bypassing the pump associated with the heating chamber.

7. The conversion method according to claim 1, further comprising injecting a neutral scavenging gas into the hydrolysis reactor.

8. The conversion method according to claim 7, wherein a flowrate of neutral scavenging gas injected into to the hydrolysis reactor is between 1.5 and 5 Nm3/h, a temperature of the neutral scavenging gas supplied to the reactor is between 80° C. and 130° C., and a relative pressure of the supply of neutral scavenging gas is higher than the relative pressure inside the reactor.

9. The conversion method according to claim 1, wherein UO2 is obtained in the form of a powder of UO2 having a specific particle surface area of between 1 $m^2$/g and 4 m2/g.

10. The conversion method according to claim 1, wherein the UO2 has a residual fluorine (F) content of less than 50 ppm.

11. The conversion method according to claim 1, wherein the UF6 supplied to the hydrolysis reactor is at a temperature of between 75° C. and 130° C.

12. The conversion method according to claim 1, wherein the dry water vapor supplied to the reactor for hydrolysis is at a temperature of between 175 and 300° C.

13. The conversion method according to claim 1, wherein an hourly mass flowrate of dry water vapor supplied to the pyrohydrolysis furnace for pyrohydrolysis is between 25 and 40 kg/h.

14. The conversion method according to claim 1, wherein a temperature of the dry water vapor supplied to the pyrohydrolysis furnace for pyrohydrolysis is between 250 and 450° C.

15. The conversion method according to claim 1, wherein a volume flowrate of H2 supplied to the pyrohydrolysis furnace is between 10 and 25 Nm3/h.

* * * * *